United States Patent [19]

Aumack

[11] 4,087,142

[45] May 2, 1978

[54] COUPLING MEANS FOR FOOD PREPARATION APPARATUS

[75] Inventor: Douglass D. Aumack, Los Gatos, Calif.

[73] Assignee: Anchor Hocking Corporation, Lancaster, Ohio

[21] Appl. No.: 775,768

[22] Filed: Mar. 9, 1977

[51] Int. Cl.² ...................... F25B 29/00; F25D 19/00
[52] U.S. Cl. .................................... 312/236; 62/238; 165/61; 312/198
[58] Field of Search ........ 312/108, 111, 198, 201–214, 312/250, 236; 165/42; 62/238, 299

[56] References Cited

U.S. PATENT DOCUMENTS

| 3,982,584 | 9/1976 | Spanoudis | 312/236 |
| 3,992,896 | 11/1976 | Janson | 62/299 |
| 4,012,922 | 3/1977 | Falensky | 62/299 |
| 4,017,131 | 4/1977 | Camenisch | 312/201 |

Primary Examiner—Casmir A. Nunberg

[57] ABSTRACT

Apparatus for coupling a first and second cabinet including a female socket in the back wall of the first cabinet and a linear actuating assembly extending through the front panel of the second cabinet. The actuator includes an extendable, retractable and rotatable male crank. The socket includes means which mate with engaging means on the crank upon extension and rotation of the crank whereupon the two cabinets may be drawn toward each other upon retraction of said crank.

2 Claims, 29 Drawing Figures

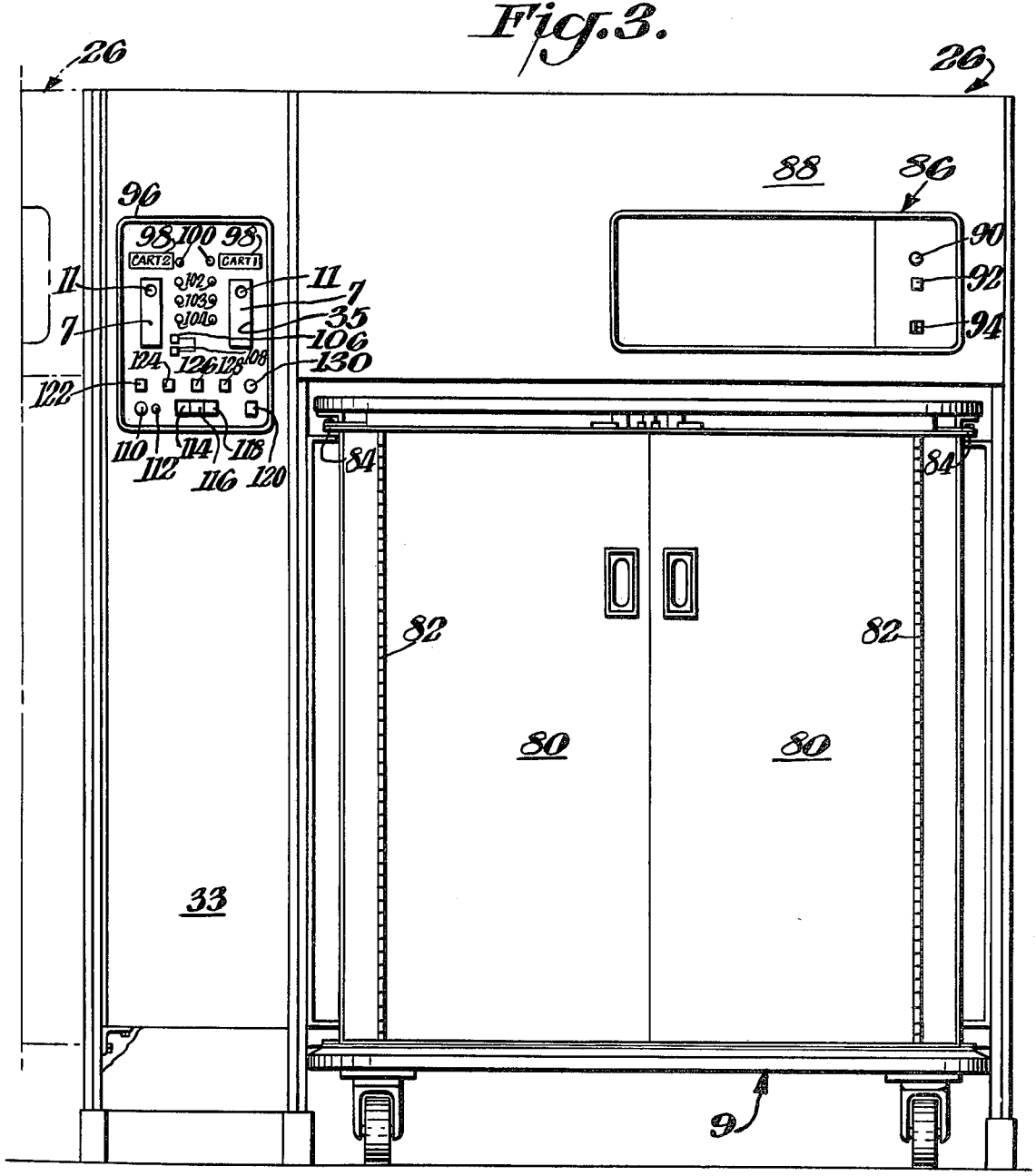

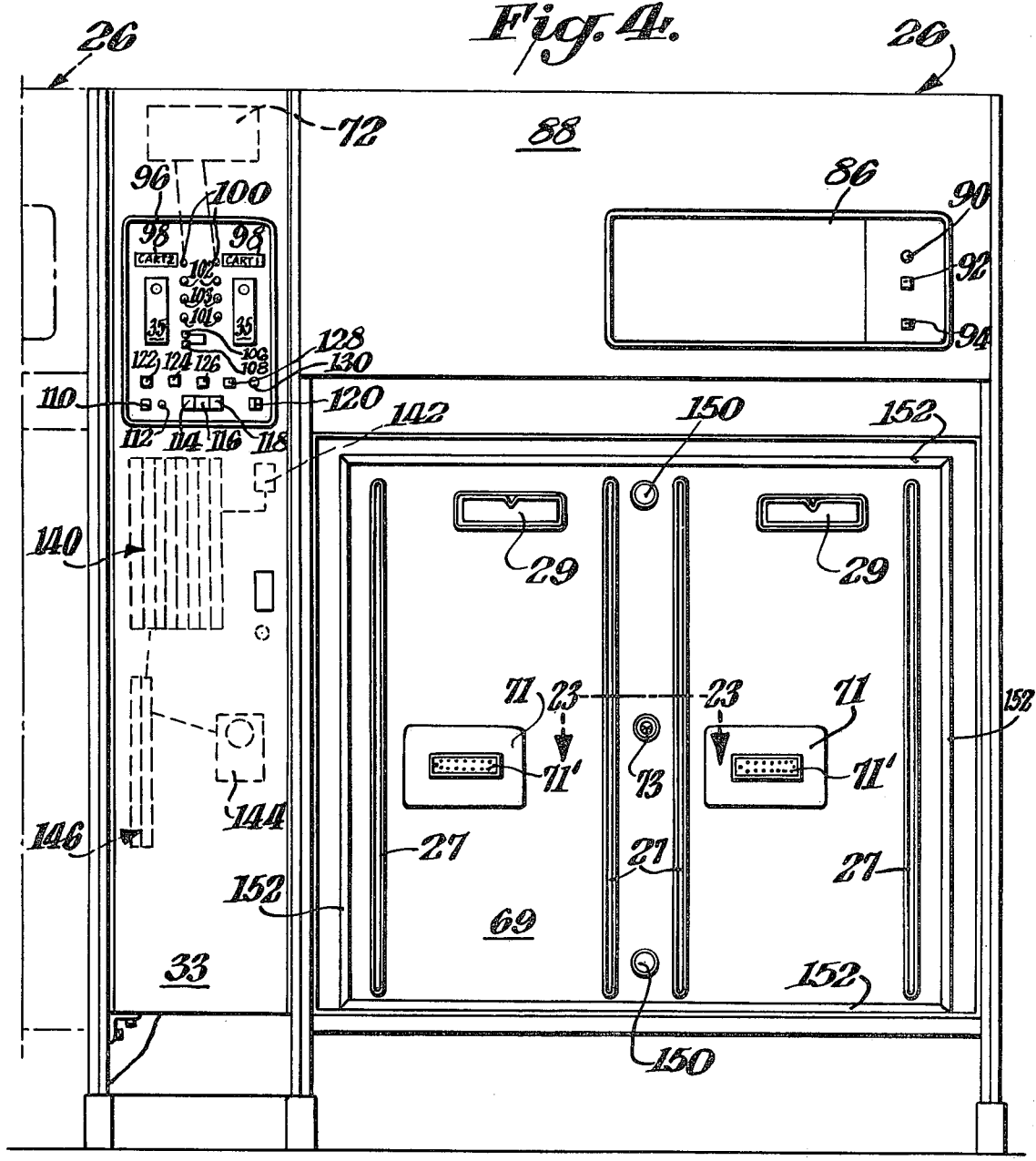

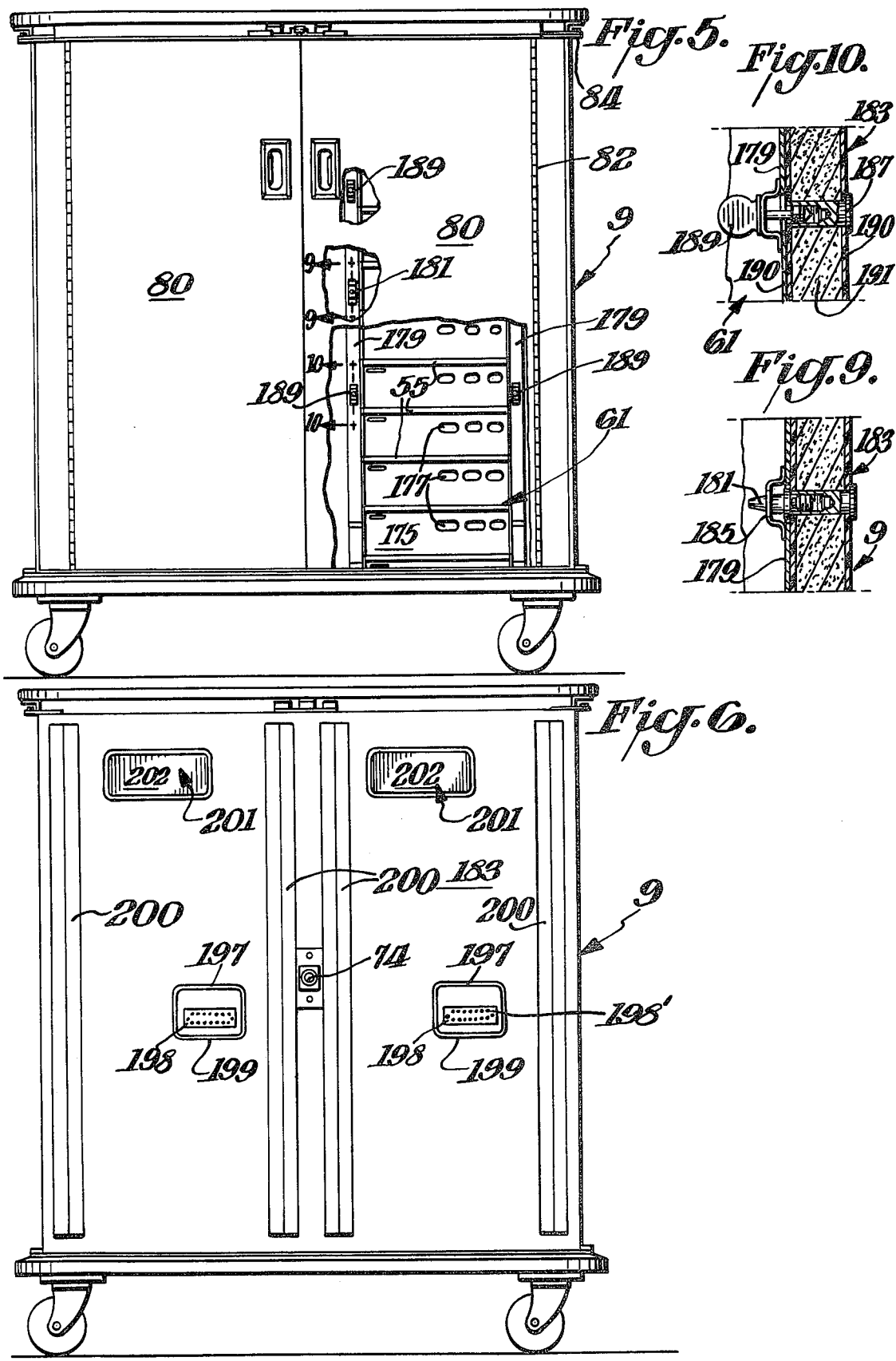

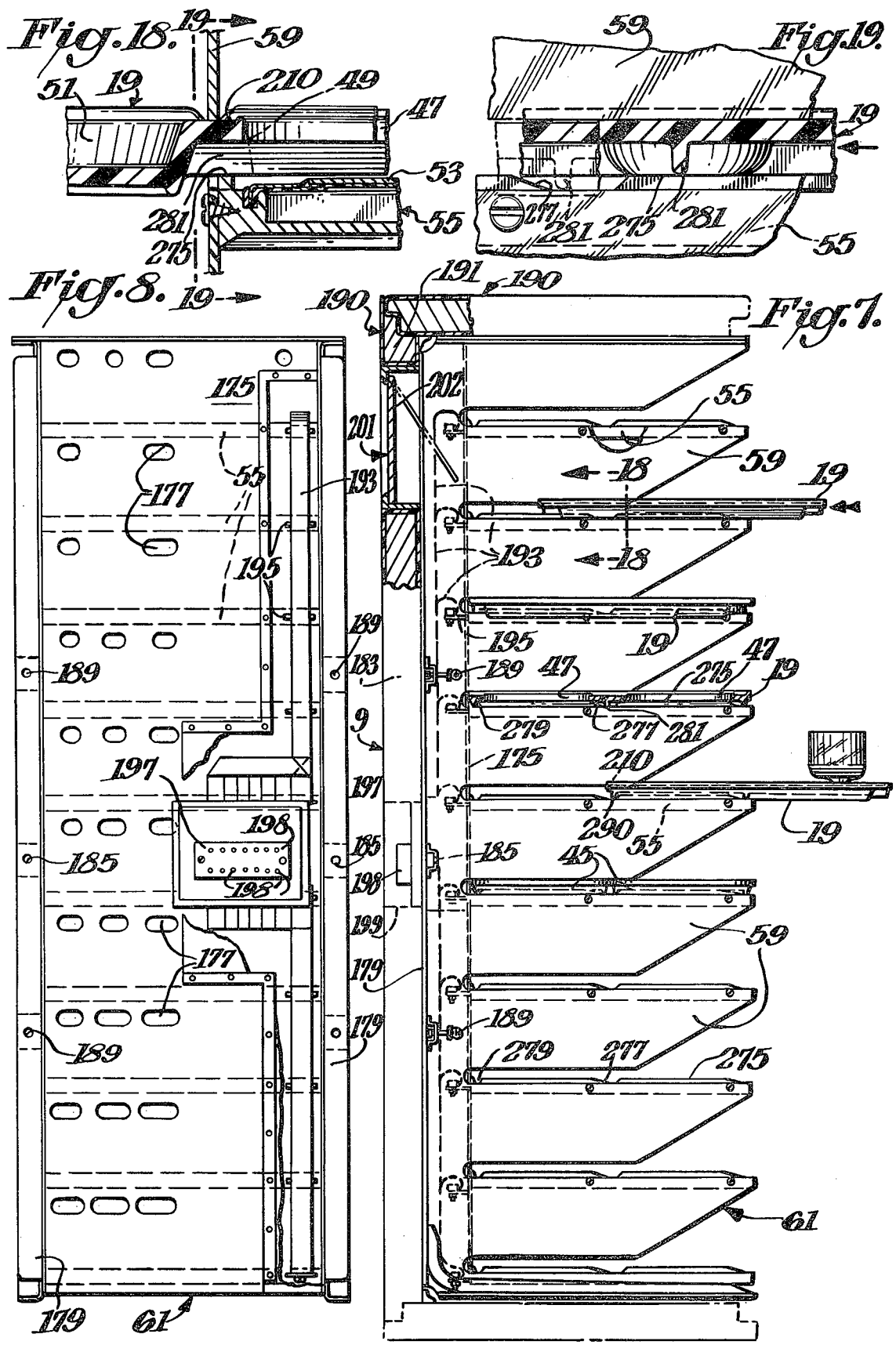

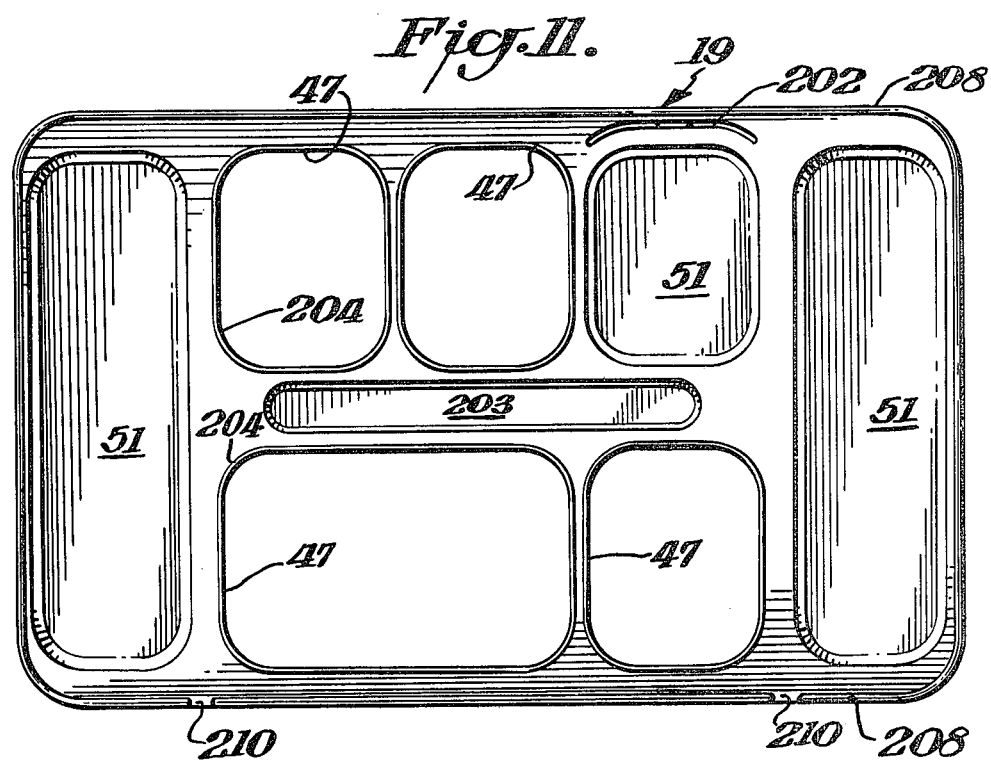
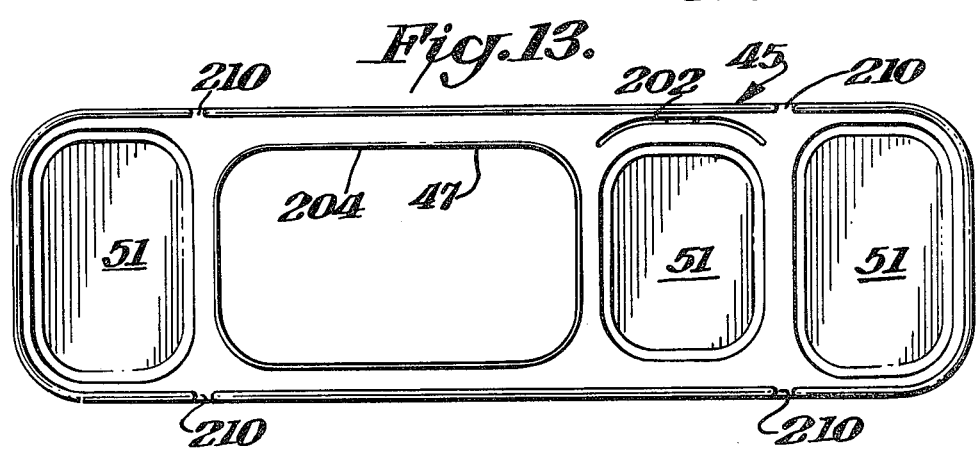

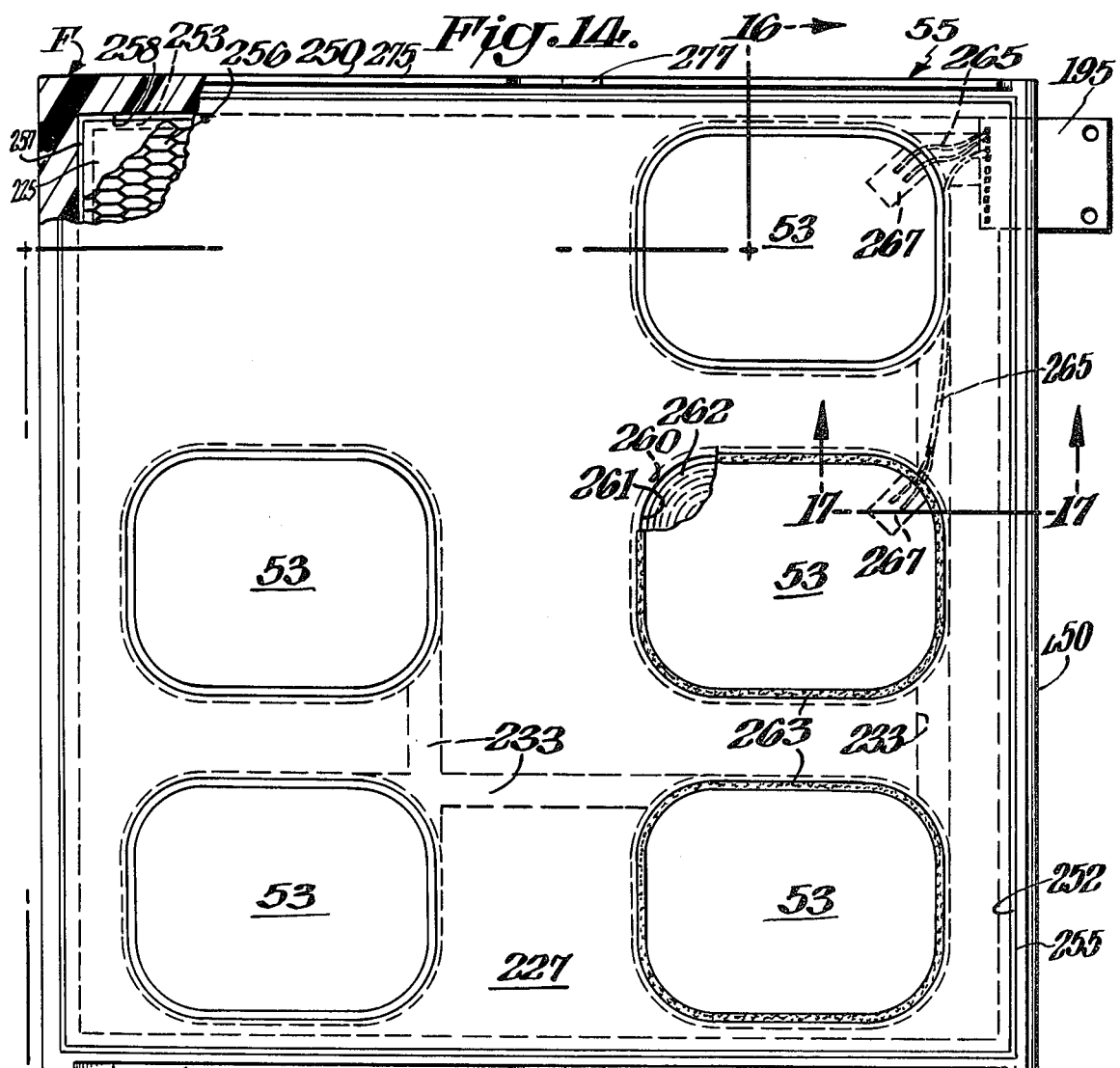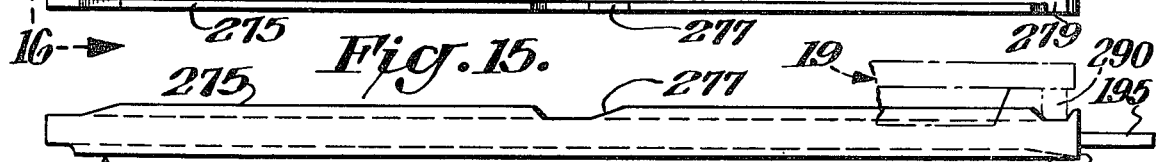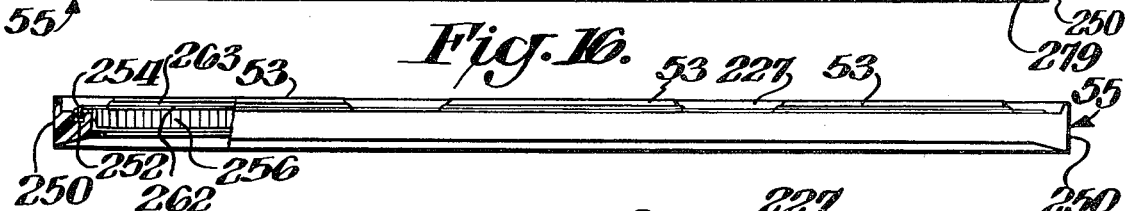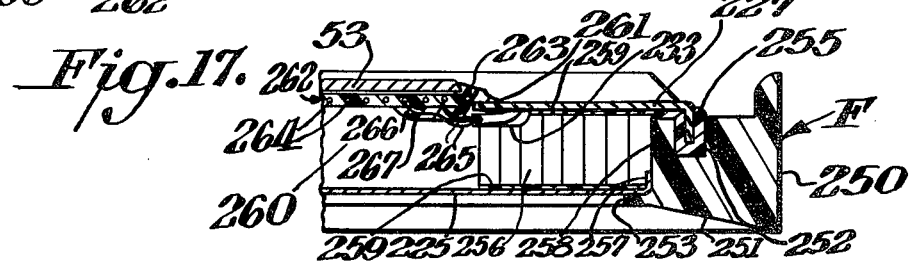

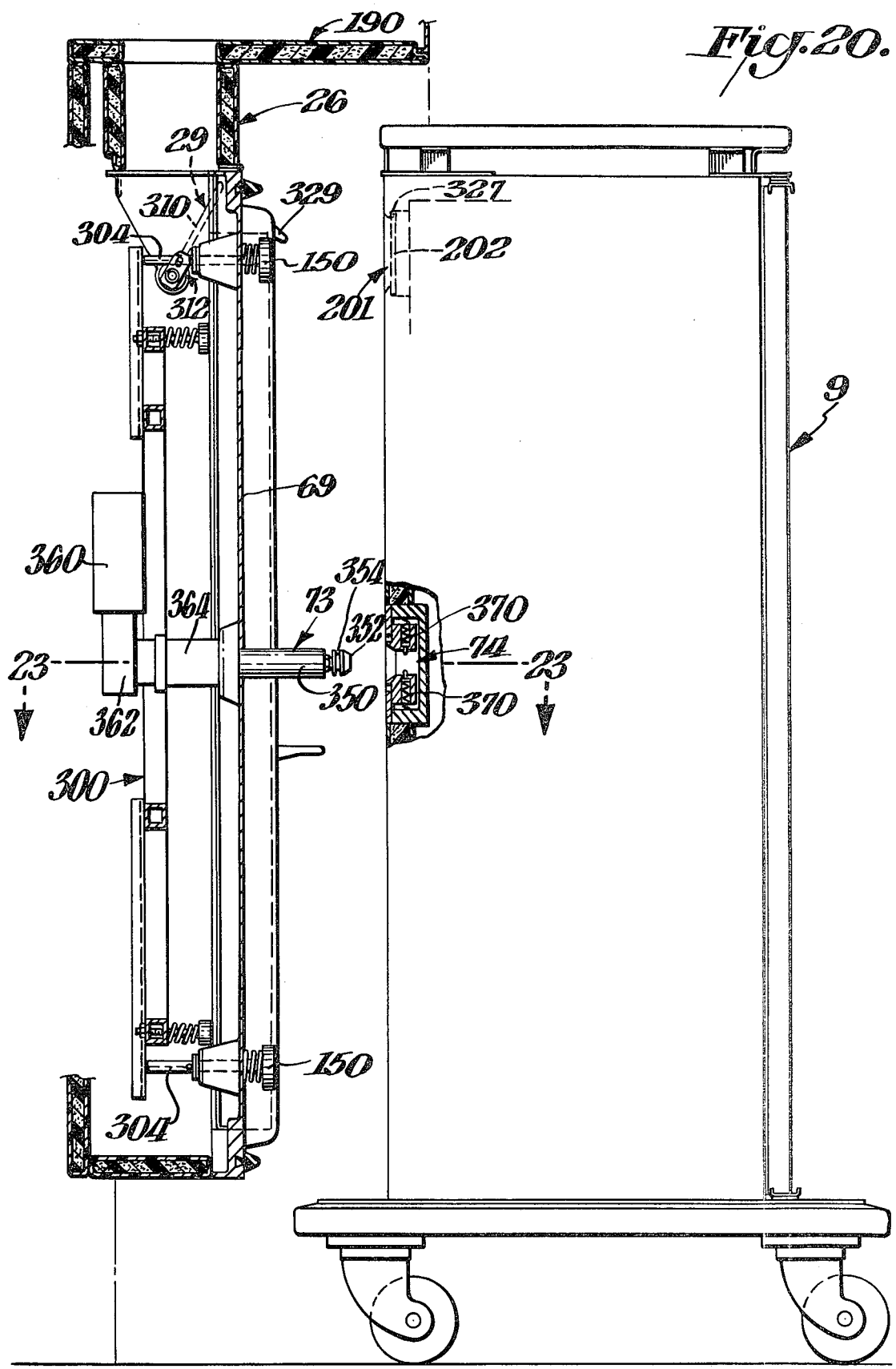

COUPLING MEANS FOR FOOD PREPARATION APPARATUS

BACKGROUND OF THE INVENTION

Related patents and patent applications to the present application are U.S. Pat. No. 4,005,745 issued on Feb. 11, 1977; U.S. Patent Applications Ser. No. 707,048 filed July 20, 1976; Ser. No. 710,697 filed Aug. 2, 1976; Ser. No. 758,454 filed Jan. 11, 1977, and Ser. No. 758,455 filed Jan. 11, 1977.

There has existed for a long time a need for an efficient, easy to operate food preparation apparatus and process which prepares nutritional and appetizing meals for hospital patients and other institutional patients, airline passengers, as well as for groups of people such as field or factory workers who are isolated from restaurants or food dispensing outlets.

Needless to say, a great deal of work has been done in this area in an attempt to achieve an acceptable and satisfactory food preparation system. However, they all have serious disadvantages or are not sufficiently sophisticated to accomplish the many aspects required by a system or apparatus for producing nutritional, wholesome, appetizing meals. Some of these known devices require separate insulated cabinets in which hot and cold foods are separately confined. To assemble a meal the attendant must select hot dishes from one compartment and cold dishes from the other and place them on a suitable tray. This is time consuming and could lead to mistakes in the required menu. Another system allows for fully assembled meal trays but has no provision for reheating or cold maintenance of the food and simply stores the food in an insulated unit. Food stored in such a manner can maintain hot food hot and the cold food cold only for a limited time.

Another system provides insulated dishes with integral heaters for heating and holding the hot portions of the meal. In certain of these systems the dish, after it has been heated in a separate unit must be assembled on a tray containing the chilled portions of the meal. In other systems, the food to be heated and the chilled food items are assembled on a single tray within a refrigerated unit, and electrical connections on the dish must mate with connections on the tray which makes connections with the unit. The dish is then surrounded by air insulated barrier which blocks off the chilled air from the heated dishes. Flavor and nutritional values are readily destroyed with such a system.

In certain of the known systems wherein both food items to be served hot and cold are stored on a single tray and the cumbersome insulated integral heating dishes are used, the attendant must come along at the proper time and press certain buttons to initiate the heating process and then must be required to manually terminate the heating after the items are cooked. This is extremely disadvantageous knowing that different foods to be cooked require different heating times and temperatures.

In addition to the prior art cited or brought to the Examiner's attention in the above three noted patent applications the following art was considered with respect to the present invention U.S. Pat. Nos. 3,908,749, 2,198,239, 3,156,102, 3,392,943, 3,872,686, 3,814,492, 2,778,206, 3,707,317, 2,872,792, 3,752,640, 2,439,487, 3,924,100, 3,836,220, 3,632,968, 2,634,589, 3,895,215, 3,255,812, 3,336,432, 2,914,927, 3,261,650, 2,568,493, 3,969,969, 2,293,316.

SUMMARY OF THE INVENTION

In summary, the present invention includes as environmental control unit (hereafter called ECU) which is a permanently stationed unit. These units are of two types and typically located in food preparation areas such as the kitchen (KECU), or in strategically located food areas or floors where the meal recipients are located (FECU). Both the ECU and the FECU include means for providing a chilled circulating stream of air in a closed loop pattern within the plenum chamber of the ECUs. The front or face of both types of the ECUs include elongated vertical air outlets which are normally closed but which automatically open when a portable food-beverage transporter (hereafter FBT) is coupled to the ECU permitting the chilled air stream circulating within the ECU to circulate through the interior of the FBT via corresponding gasketed air inlets in the back wall of the FBT which are automatically opened when the FBT is coupled to the ECU. The ECU face also includes air return ports which are normally closed but which automatically open when the FBT and ECU are coupled to return and recirculate the chilled air to the air chilling device after it has been discharged through mating outlet ports on the back wall of the FBT which are likewise automatically opened when the FBT is coupled with the ECU.

Once the FBT is moved to a position within several inches of the face of the ECU a mechanism extending through the front panel of the ECU is actuated and extends toward the back panel of the FBT to connect with a mating element in the rear wall of the FBT and automatically retracts to pull the FBT tightly up against the face of the ECU to couple them together.

Both the ECU and the FBT are constructed of insulated sections of "pultruded" fiberglass panels which will be described later. The FBT provides for the containment of one or two heater shelf racks with cantilevered supports which in turn support in a one above the other relationship heater shelves upon which the trays are placed. Each tray may contain both food to be heated and food to be served cold. Electrical connections from the back of each heater shelf are gathered together at a plug located at the back wall of the heater shelf rack which automatically mates with a power source plug located in the front panel of the FECU during the coupling operation of the FBT and FECU. The heater shelf contains a series of strategically spaced potentially raised heater surfaces located under the slightly raised portions of the surface of the heater shelf itself. The serving trays upon which the food is supported contain a plurality of dish holes or openings through the tray surface which holes correspond in position to that of the raised heater elements of the heater shelf when the tray is positioned on the heater shelf. Dishes containing food to be heated or cooked are supported within the holes or openings in the trays whereby when the trays are in position within the heater shelf rack the bottom of the dishes to be heated contact the raised heater elements of the heater shelf and are moved out of contact with the edge of the openings in the trays which normally support the dishes to be heated thus preventing heat transfer from the dish during the heating process to the tray itself. The raised heater elements do not contact the tray when the tray is positioned on the heater shelf.

Externally located to the FECU is a transport command unit (hereafter TCU) which is programmed by a transport modular pack (hereafter TMP) to automatically perform the time/temperature curves of the heater elements in the FBTs. The TMP consists of a volitile memory into which the time/temperature curves for the individual heater element are selected. When placed into the TCU the TMP instructs the TCU to provide the programmed time/temperature curves for the selected heater elements in the heater shelves. The time/temperature curves for each heater element may be the same, or different depending on the item placed within the dish to be heated. The variables of food density, weight, and configuration are accounted for.

Once the food trays are prepared and positioned onto the heater shelf racks within the FBT, the FBT may be coupled to an KECU whereby, chilling of all the dishes supported on the tray including those to be heated automatically commences. If desired, the chilled FBTs can be transported to other areas by suitable monorail systems, lift systems, by manual means or the like. Upon arrival at the desired floor, station, cottage, or the like the FBT is ready for connection with an FECU. The coupling operation of the FECU and FBT will not occur until the transport module pack (hereafter TMP) which accompanies the FBT has been inserted into a proper receptacle of the TCU which automatically operates means for coupling the FECU and FBT. At a predetermined time, the programmed TCU turns on the specific heater elements to heat the dishes to be served hot for the desired time and temperature curves as selected. The chilling of the FBT is continued throughout the heating cycle which cools the noninsulated walls of the dishes being heated as well as the noninsulated lids or covers therefor which provides more nutritious and tasty food as explained in copending application Ser. No. 710,697 filed Aug. 2, 1976. When the meals are ready for serving, one merely opens the FBT door and pulls out the desired tray or trays containing the required hot and cold food items for subsequent delivery. The TCU will begin the heating program automatically at the desired time. If required or desired, the heating program can be delayed or the individual time/temperature curves can be revised.

In food preparation center or kitchen, there can be a quantity of KECUs which accommodate the FBTs for chilled maintenace only after they have been loaded with the serving trays containing food items. Once all of the FBTs have been loaded and connected with the KECUs the individual FBTs may be released from the chilled maintenance and sent to the proper FECU having an attached TCU, via the various means mentioned above.

DESCRIPTION OF DRAWINGS

FIG. 3 is a front elevation of the FBT engaged to the FECU including the transport command unit (TCU).

FIG. 4 is a front elevation of the FECU and the TCU.

FIG. 5 is a front elevation of the FBT with a portion broken away to illustrate the support rack for the serving trays and the heater shelves.

FIG. 6 is a rear elevation of the FBT shown in FIG. 5.

FIG. 7 is a side elevation of the heater shelf rack illustrating serving trays in various positions.

FIG. 8 is a rear elevation of the heater shelf rack shown in FIG. 7 illustrating the electrical connector, for the heater shelves, and the air circulation vents.

FIG. 9 is a section taken along line 9—9 of FIG. 5 illustrating the means for aligning the heater shelf rack within the FBT.

FIG. 10 is a section taken along line 10—10 of FIG. 5 illustrating the means for anchoring the heater shelf rack to the FBT.

FIG. 11 is a top view of the general diet serving tray.

FIG. 12 is a front elevation of the FIG. 11 tray.

FIG. 13 is a top view of a modified diet serving tray which can also be used with the present invention.

FIG. 14 is a top view of a heater shelf with portions broken away.

FIG. 15 is a side elevation of the heater shelf of FIG. 14.

FIG. 16 is a section taken along line 16—16 of FIG. 14.

FIG. 17 is a section taken along line 17—17 of FIG. 14.

FIG. 18 is a fragmental section taken along line 18—18 of FIG. 7 illustrating a serving tray sliding into position along the heater shelf rack.

FIG. 19 is a fragmental section taken along line 19—19 of FIG. 18.

FIG. 20 is a side elevation in section illustrating the FBT in uncoupled position with respect to the ECU.

DESCRIPTION OF THE INVENTION

Figure 1:
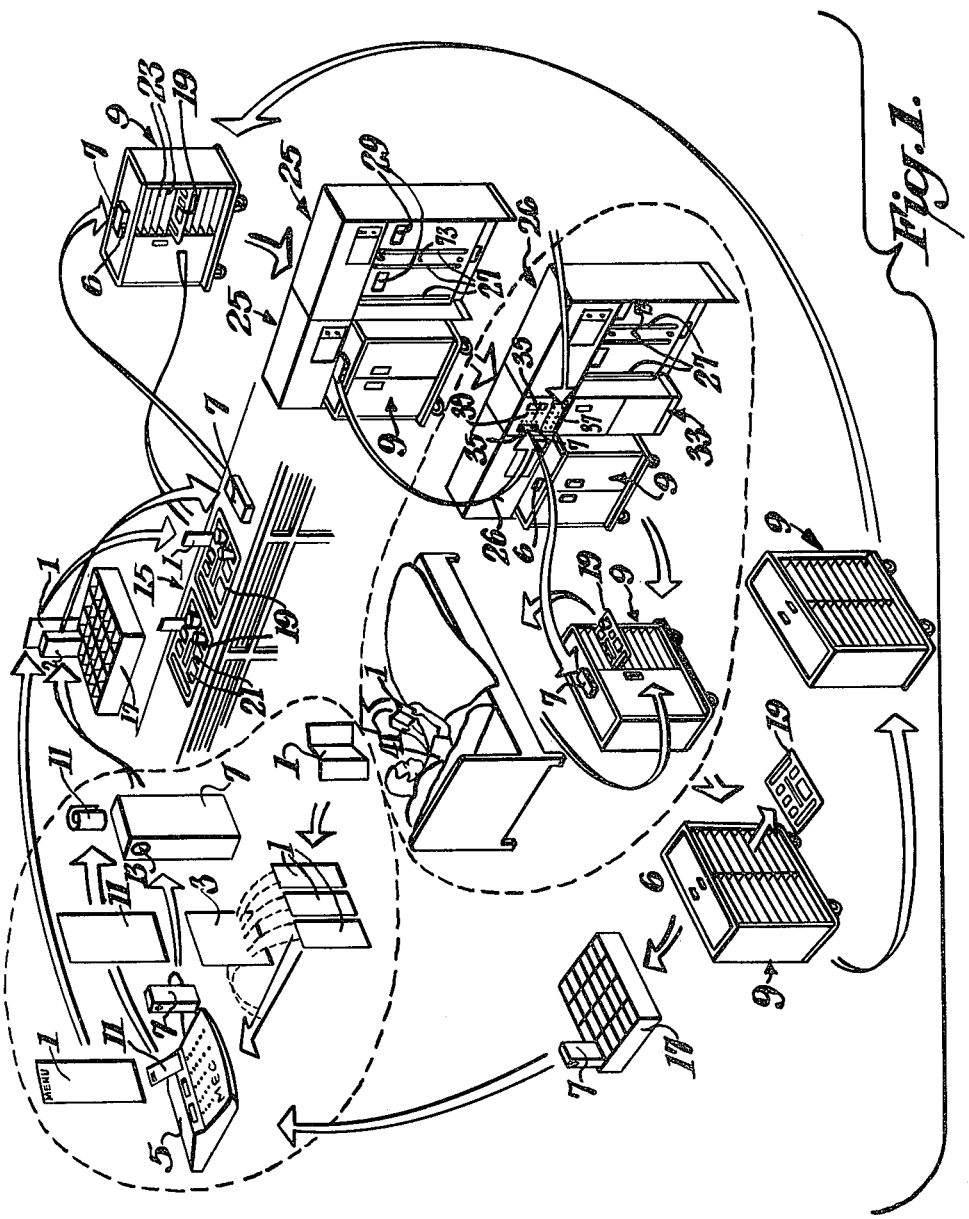
FIG. 1 is a diagramatic view of the present invention and includes the KECU.

The present invention is shown diagramatically in FIG. 1 of the drawings. As seen therein, menus 1 set forth a patient's food selection for the day including breakfast, lunch and dinner. A coding chart 3 is used by the operator to translate the food items selected on the menus 1 into a series of numerical codes which are representative of time/temperature curves.

A master entry console (MEC) 5 which is a programmable electronic calculator unit translates the numeric codes into binary codes. The MEC program format consists of a question-answer approach. Communication between the MEC and operator consist of a question and answer approach. The MEC asks the question based on the key actuated and the operator answers the request by performing a specific function. The MEC 5 can input into the transport module pack (hereafter TMP) 7 a cart destination code, meal code, date code and heater time/temperature curve code. The TMP 7 consists of a bit random access memory device powered by a small alkaline battery and enclosed in a plastic enclosure. The TCU 33 translates the codes within the TMP 7 into its main computer memory for controlling the heater elements in the FBT 9 for cooking and/or heating the food items to be served hot. Potentially there are 100 such heater elements within the FBT 9. The MEC 5 also produces a printed paper record 11 for each TMP. This document or record 11 contains pertinent printed data in regard to the heater element settings within the FBT 9, tray quantities, meal and date, and FBT destination code. The record 11 is rolled up and inserted in an opening 13 in the side of the TMP 7. In addition, the MEC 5 also permits the operator to perform a diagnostic check of the heater element within the FBT 9 to insure that all the heater elements are operational within preprescribed limits.

The prescribed meal menu along with the TMP 7 including the printed record 11 are then transported to the food tray assembly station 15 in the module transport box (MTB) 17.

At the food tray assembly station 15, food handling personnel with the use of the menu 1 selects the proper food and beverages to be served hot and locates them on the patient's tray 19. The printed record 11 is used at all times to verify which time/temperature curve to be used for each heater element. The trays 19 are then positioned on pre-assigned heater shelves 23 of the FBT 9. The TMP 7 with its predetermined destination code is secured by clip 6 on top of the FBT 9 and accompanies the FBT 9. Details of the heater shelves 23, the trays 19 and the FBT will be explained at a later point in the specification.

The FBT 9 loaded with trays 19 supporting food items is then moved to a KECU 25 and coupled therewith as shown in the drawing. The KECU 25 is a unit which has means to circulate chilled air at approximately 40° F. to the FBT 9 through normally closed air inlets 27 and back through normally closed outlets 29 of the KECU. The inlets and outlets are automatically opened when the FBT 9 is coupled with the KECU 25 which operation will be explained in greater detail hereinafter. The KECU 25 is installed in multiples in the kitchen or food preparation area and they have a common remote compressor/condensor unit or similar means for providing refrigeration of the circulating air. The KECU 25 does not have the electrical capability to heat the food within FBT 9.

The FBTs 9 are maintained in chilled condition until their scheduled distribution. They are then transferred to the desired floor by monorail systems, suitable elevator lift systems, or other known means (not shown) for effecting such transportation.

When the FBT 9 reaches the proper floor of the institution where the patient resides it is coupled with an FECU 26 which is similar to the KECU 25 except that it has an electrical connector 71, is connected to a transport command unit (TCU) 33, has a self-contained air chilling unit and is electrically capable of heating food. The drawing shows an FECU connected to each side of a TCU 33 since one TCU can handle two FECUs 26 and two FBTs 9. The TCU 33 receives the TMPs 7 for each FBT 9 in receptacles 35 and feeds the programmed instructions contained in the TMPs 7 for each individual heater element in the FBT into the microprocessor portion of the TCU 33. The TCU 33 automatically performs load sharing of available power within each FBT 9 to prevent drawing of power in excess of a stated maximum during nominal 32 minute heating cycle. The TCU 33 automatically turns on the rethermalization cycle for the chilled food to be heated in the FBT 9 at specific starting times manually set into a 24 hour clock which is shown in FIG. 4 and will be described later herein. The TCU also has a capability of changing the setting of one or more specific heater elements if the need arises through the program change control panel 37 (PCC). Visual means are provided to indicate certain situations and conditions regarding the operation of the units which will be explained later.

During the rethermalization cycle, the chilled foods to be served hot which are stored in dishes on the trays are heated to the desired temperature and cooked. As will be explained later, the dishes to be heated extend partially through openings in the tray and contact the raised heater elements therebelow. The foods to be served cold on the same tray are maintained in chilled condition. Chilling of the noninsulated dishes with their noninsulated lids or covers continues during the heating cycle.

Once the cycle is completed, the FBT 9 is removed from the FECU 26 after which the trays are removed and served to the patient 41. As shown in the drawing, the menu 1 is also delivered to the patient 41 and the TMP 7 is removed from the TCU 33 and replaced in the clip 6 on top of the FBT 9. After the patient has eaten, the FBT 9 along with the trays 19 are then washed, sanitized and returned to the food assembly station 15 for use again in the cycle. The TMP 7 is placed in the MTB 17 and returned to the dietary office for use in the next appropriate meal cycle as shown in the drawing.

Figure 2:
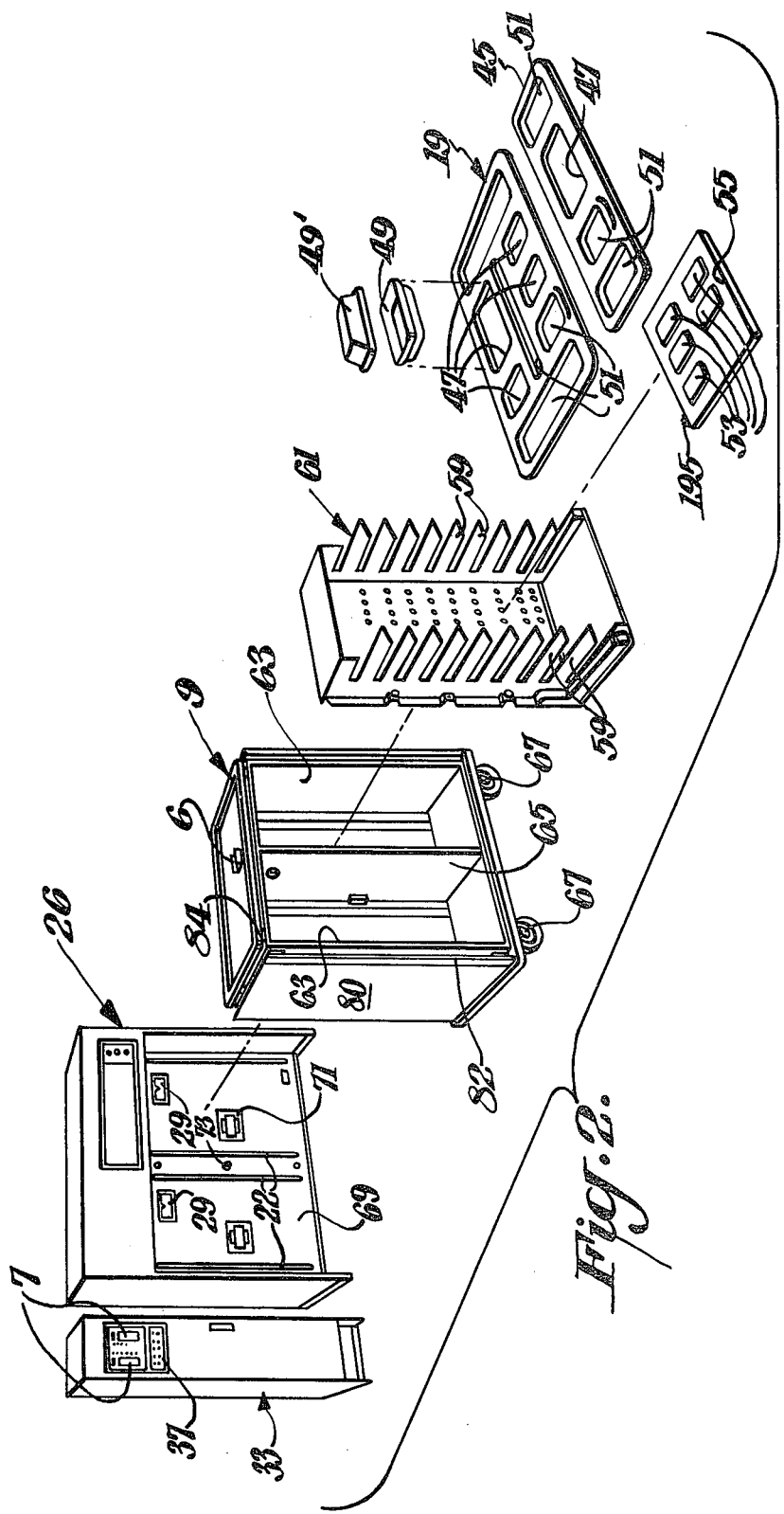
FIG. 2 is an exploded view of the main components of FIG. 1.

FIG. 2 is an exploded view of the system or assembly showing the main components of the FIG. 1 assembly. There are two types of trays which can be used with the assembly. The large general diet tray 19 accommodates full meals and the half size, modified diet tray 45 can be used for snacks, half meals and special diets. Both trays have holes or openings 47 which extend completely through the tray surface and support the dishes containing food to be heated such as the noninsulated entree dish 49 with its noninsulated cover or lid 49'. Dishes which fit in the other holes through the tray can be used for soup, cereal, bread, dessert, vegetables, fruit and the like. These dishes, with the exception of the entree dish, are interchangeable from hole to hole. Two smaller dishes can be used in place of the larger entree dish in the entree dish hole. In addition, the trays contain indents 51 in the tray surface which are used exclusively for supporting the dishes containing food to be served in chilled form. Chilled dishes may be placed in any opening 47 as long as the applicable heated surface is not programmed for heating.

When the trays 19 or 45 are supported by the heater shelf rack 61 in the FBT 9 they rest on heater shelves 55 whereby the raised heater elements 53 of the shelves 55 urge the dishes supported in the tray openings 47 out of contact with the tray since the element 53 extends above the general surface of the heating shelf 55. This eliminates any heat being transferred from the heated dishes supported by the raised heater elements 53 to the tray structure itself. Suitable wiring interconnects are supported within the heater shelf 55, the structure of which will be shown and described later (FIG. 14) and the wires gather at a terminal connector 195 of the heater shelf 55.

The heater shelves 55 are in turn supported on cantilever arm supports 59 on a heater shelf rack 61 which in turn fits within the partitions 63 of the FBT 9. Each FBT can accommodate two heater shelf racks in side by side relationship being divided by a central partition 65. As mentioned heretofore, the FBT 9 is moved upon its casters 67 into either the FECU 26 or the KECU 25 with the rear wall of the FBT interfacing and coupling with the front wall 69 of the FECU 26 or FECU 25. The description following is primarily directed to the FECU 26. The electrical power source wires for the heater shelves 55 are gathered at connector 195 and are individually interconnected to a single connector 197 (FIG. 8) at the rear wall of the heater shelf rack 61 and this connector in turn mates with connector 71 located in the front wall of the FECU 26. The inlets 27 and the outlets 29 for circulating chilled air to the FBT 9 are shown on the front wall of the FECU 26. A linear actuator 73 extending from the front wall of the FECU 26 connects with a mating socket on the back panel of the FBT 9 to automatically pull in the FBT 9 against the front wall of the FECU 26 to form a tight fit, to actuate the inlets 27 and outlets 29 and to connect the electrical connectors of the heater shelf racks 61 with the sockets 71 in the front wall of the FECU 26. The actuator and the means for operating the normally closed outlets and inlets 27 and 29 will be explained more fully hereafter. The FECU 26 is connected to the TCU 33 which when programmed by TMP 7 initiates and controls the heating and cooling cycles for the food and beverage within the FBT.

DESCRIPTION OF THE CONTROLS FOR THE ECU AND FBT

FIG. 3 illustrates the FECU 26 coupled with the FBT 9. The TCU 33 which controls the operation of one or more FECUs and FBTs is also shown connected to the FECUs 26. As shown in FIG. 3, doors 80 of the FBT 9 will fold outwardly and back against the side walls of the FBT 9 by virtue of a piano hinge 82 for each door and a pivot hinge 84, likewise, for each door. Space remains between the two sections of the door and FBT walls to permit access to all surfaces of the door and FBT side walls. Such an arrangement also prevents damage to the doors since when in the open position, the ends of the doors do not extend beyond the base of the FBT.

The controls for the operation of the system are shown in both FIGS. 3 and 4 wherein FIG. 4 illustrates the FECU 26 along with the TCU 33 but without the FBT 9. Mounted on the upper part of the FECU 26 is a control panel 86 relating to the refrigeration system and the actuating means 73 for coupling the FECU 26 or KECU 25 to the FBT 9. The air chilling device 15 housed in compartment 88 located at the top of the FECU 26. It should be pointed out that instead of having its own compressor/condenser unit the compartment 88 can be connected to a remote compressor/condenser unit which would supply the liquid and suction lines to one or more KECUs 25 or FECUs 26. Signal light 90 will indicate to the attendant the fact that the chilled air has exceeded an operating temperature of 55° F. If the signal 90 is activated the unit could require services because of possible bacterial contamination within the evaporator coil and chilled air plenum chamber.

The button 92 below the signal light 90 is a reset button for signal light 90. Also included on the panel 86 is a rocker switch control 94 which pivots between two positions identified as "extend" and "retract". This button controls the operation of the actuator 73 shown in FIG. 4 which automatically couples or uncouples the FBT 9 to the FECU 26. This operation will be explained hereinafter. As seen in FIGS. 3 and 4, a TCU 33 serves to control and monitor two of the FECUs 26 as well as two FBTs 9. As shown in FIG. 4, partially in phantom, the FECUs 26 are fixed to each side of the TCU 33. Affixed within the front surface of the upper portion of the TCU 33 is another control panel 96. As indicated along the panel at 98 two FBTs ("cart 1", "cart 2") are controlled from the panel. The panel 96 includes a series of signal lights wherein the signals 100 will indicate when power is being supplied to the FECUs 26. The lights 102 indicate whether or not the TMPs 7 have been accepted by TCU 33. Signal lights 103 indicate whether or not the food to be heated in the FBTs 9 has begun the rethermalization cycle. Signal lights 104 advise the attendant when the food is ready to be served.

It may be desirable to change or alter the programming for some of the heater shelves 55 in the FBTs 9 after the TMPs 7 have been prepared and inserted in the receptacles 35 of the TCU 33. Suitable controls are provided at the bottom of the control panel 96 to take care of this contingency. To effect such a change in programming the change control system is activated by key switch 110 after which a rocker switch 112 (see FIG. 4) is moved to FBT 1 or FBT 2 position to select the proper FBT 9 attached to the TCU 33. The thumbwheel switch 114 is then rotated to designate the proper heating shelf from 1 to 20 in which the time/temperature code is to be reprogrammed. Thumbwheel switch 116 is then roated to designate the proper heated surface 53 from 1 to 5 for which the time/temperature code is to be altered. Thumbwheel switch 118 is then rotated to indicate which of the fifteen time/temperature codes is to be inserted into the TCU 33 programmer. Button 120 is depressed to enter this information into the TCU 33. One or more of the buttons positioned above the thumbwheel switches 114–116 and 118 can be depressed to feed additional specific changes desired. Button 122 sets up an early start for the food preparation (by passes the 24 hr. clock). Button 124 is depressed to cut off the power to the particular heater shelf as selected by 114. Button 126 is depressed to delay the start of the tray preparation or heating cycle as selected by 114. Button 128 is depressed if the food on the shelf selected by 114 is to be maintained warm after the cycle has been completed. Signal light 130 indicates whether or not the reprogramming instructions have been received by the TCU 33.

With the completion of the heating cycle and after buttons 126 and 128 have been depressed, LED 106 will illuminate to indicate that the delay tray is ready to be served and button 108 is then depressed when the delay tray is served thereby turning off that specific heater shelf. LED 106 is a digital indicator to identify by number the particular delay tray to be served.

The TCU 33 contains electronic components for operating the raised heated elements 53 of the heater shelves 55. Eight driver boards 140 are used to switch the function of the heater elements (described later) in heater shelves 55 on or off on command from the TMP 7 programmed micro processor unit 146. Automatic start of the rethermalization cycle for each FBT 9 is provided by a programmable sequence 24 hour clock 144. All electrical functions within the TCU 33 are protected by circuit breaker unit 142.

FIG. 4 also shows the chilled air outlets 27 for the FECU 26 as well as the chilled air inlets 29 for the FECU 26. The electrical connectors 71 which receive the electrical connectors 197 of heater shelf racks 6 within the FBT 9 to operate the heater shelves are also shown in FIGS. 4. In addition, spring supported shafts with bottom heads 150 are also shown in FIG. 4. These are forced inwardly by the back of the FBT 9 moving inwardly toward the FECU 26 or KECU 25 when coupled to the FBT 9 causing the air inlets and outlets of the FECU 26 to open. This operation will be explained hereinafter.

Suitable electrical power leads connect the electronic circuit 9 and components of the TCU 33 with the electrical connectors 71 whereby the functions and operations of the food preparation in the FBTs when plugged into the connectors 71 can be controlled. A circuit breaker 72 controls the main power input for all the cooperating units. A gasket 152 extends around the perimeter of that portion of the front panel 69 of the KECU 25 and FECU 26 which mates with the perimeter of the FBT 9 to tightly seal the coupled units.

DESCRIPTION OF HEATER SHELF RACK AND FBT

FIGS. 5–9 depict the heater shelf rack 61 and the manner in which it is installed in the FBT 9. FIG. 7 shows a side elevation of the heater shelf rack 61 while FIG. 8 shows a rear elevation of the heater shelf rack. As seen therein the rack 61 includes a series of vertically aligned cantilever supported heater shelf supports or arms 59 which support the heater shelves 55. As seen in FIG. 7, the cantilever arm supports 59 extend outwardly from the rear wall 175 of the rack 61 at each side thereof. Each opposing pair of arms carries a heater shelf 55. The rear wall of the heater shelf rack 61 includes vents 177 which are of greater area at the bottom of the rack but which gradually lessen in area as they extend from the bottom shelf upwardly to the top of the back panel 175. This design of the vents in the back panel 175 is important in that they provide equal flow of chilled air to be drawn off of each tray level thus eliminating stratification of the chilled air within the FBT 9. Each FBT 9 accommodates two of the heater shelf racks 61 in side-by-side relationship. The location or position of the rack 61 within the FBT 9 is assured by the alignment means as shown in FIGS. 5 and 9. Vertical legs 179 extend along each side of the shelf rack 61. Alignment pins 181 are anchored in the rear panel 183 of the FBT 9 (FIG. 9) and extend inwardly to the interior of the FBT. Alignment sockets 185 are supported by each leg 179 of the shelf rack which sockets slide over the alignment pins 181 when the rack is installed. This insures exact positioning of the heater shelf rack 61 within the FBT 9. Not only are the heater shelf racks 61 aligned in position within the FBT 9 but they are also locked in place by means shown in FIGS. 5, 7, 8 and 10. In the rear panel of the FBT there are supported threaded barrels 187 which align with each of the rails 170 of the shelf rack 61. Affixed to and extending through the rails 179 are complimentary positioned threaded thumbscrews 189 which are screwed into the barrels 187 to firmly lock the heater shelf rack 61. Affixed to and extending through the rails 179 are complimentary positioned threaded thumb screws 189 which are screwed into the barrels 187 to firmly lock the heater shelf rack 61 in position within the FBT 9.

The FBT 9 as well as the FECU 26 and the KECU 25 are formed of panels consisting of pultruded fiberglass sections 190 (see FIGS. 7, 9, 10 and 20) which are filled with suitable insulating foam material 191 such as polyurethane to form insulated panels. These sections are formed by a pultruded process which is a commercial operation wherein the panels are pulled from the extrusion device rather than being extruded. After the sections 190 are formed they are foam filled with the foam material 191 to an approximately 2#/cu.ft. density, to provide proper insulative characteristics of the finished FBT and ECU.

Each heater shelf rack 61 includes a series of electrical ribbon cables 193 connected to a circuit board connector 195 which extends from heater shelf 55 (FIG. 7). As shown better in FIG. 8 the cables 193 extend upwardly from the bottom series of heater shelves 55 and downwardly from the upper shelves 55 to be gathered at an electrical connector housing 197 positioned in the back panel 175 of the heater shelf 61 and plugged into connectors 198 within the housing 197 which when the rack 61 is installed in FBT 9 is exposed to allow mating of connectors 198 with connectors 71 of the FECU 26 or KECU 25. FIG. 6 shows the rear wall 183 of the FBT 9 which wall has suitable openings 199 therein to permit access to the electrical connectors 198 within housing 197. Electrical connector 198 has a series of contacts 198' that engage with a series of sockets 71' in connectors 71 of the FECU 26. Also shown in the back panel 183 of the FBT 9 are normally closed chilled air outlets 200 as well as the chilled air inlets 201. The female socket 74 which cooperates with the actuator head 73 is also shown.

General diet trays 19 and modified diet trays 45 are shown in various positions in FIG. 7. More will be explained about the trays and how they mate with the heater shelf at a later point herein.

DESCRIPTION OF SERVING TRAYS

The general diet tray 19 is shown in FIGS. 11 and 12 while the modified diet tray 45 is depicted in FIG. 13. The general diet tray 19 as well as the modified diet tray 45 are formed preferably of a suitable plastic material such as polycarbonate and are light in weight. The tray 19 includes a slot 202 in which the menu 1 for the particular meal being served can be inserted while the elongated indent 203 in the tray supports napkins and tableware. The tray indents 51 are used to support dishes containing food items which are to be served cold such as salads and desserts as well as glasses, cups, condiments, milk cartons, and the like. The dish supports 47 consist of holes or openings extending through the surface of the tray with a raised bead 204 extending around the periphery of the dish support 47 for supporting the dish as will be explained later. Of course, the tray openings 47 can also be used for dishes containing food to be served cold by not programming the heating cycle for the particular raised heated surface 53 underlying the tray opening 47 to be heated during the food preparation cycle.

The modified diet tray 45 shown in FIG. 13 has the similar dish indents 51 and dish openings 47 as with the FIG. 11 tray.

Tray 19 also has a raised bead 208 which extends around the tray periphery and in the leading edge side of the tray there are two notches 210 in the raised bead which serve as guides when inserting the tray in the heater shelf rack 61. These notches 210 are also shown in FIG. 12. The operation of these guiding notches will be explained further after the heater shelf 55 itself has been more fully described. The modified diet tray 45 also has notches 210 however here they exist in alignment in both the leading and trailing edge sides of the tray.

DESCRIPTION OF HEATER SHELF

FIGS. 14–17 illustrate the heater shelf 55 used with the present invention. As seen therein, there is provided a frame F, a lower panel 225, an upper panel 227 and a honeycombed layer 256 between the upper and lower panels. The lower panel 225 is formed of fiberglass, stainless steel, or the like. The upper heater panel 227 is formed of stainless steel and incorporates strategically spaced holes 260 for raised elements 53 which locate etched resistive film heaters 262 which are secured to raised elements 53 and the edge 261 of the spaced holes 260 of panel 227 by bonding with silicone rubber 263. The film heaters supply heat to the raised heater elements 53. The film heaters 262 are wired electrically to the inward extension of printed circuit connector 195. The printed circuit board 195 is secured to the heater shelf frame F at the upper right hand corner as shown in FIG. 14.

As further shown in FIGS. 14–17, the heater shelf frame F has vertically extending edges 250 which extend upwardly and vertically extending edges 251 which extend downward. The upper surface of Frame F has a peripheral groove 252 and the lower surface of frame F has an inwardly extending peripheral flange 253. The upper heater shelf panel 227 fits over the heater shelf frame F and its skirted edges 254 extend downwardly to fit within the peripheral groove 252 of the heater shelf frame F and the edges 254 are bonded in place with a polysulphide adhesive 255. The lower heater shelf panel 225 fits within the heater shelf frame F and its skirted edges 257 are crimped as shown in FIG. 17 to fit within the opening 258 of the heater shelf frame F and come to rest upon peripheral flange 253. The edges 257 of lower panel 225 are bonded to the frame with a polysulphide adhesive 255. Sandwiched between the upper heater shelf panel 227 and the lower heater shelf panel 225 in those areas not occupied by the heater elements 262 is a honeycombed aluminum or nomex filler layer 256 as shown in the upper left-hand corner of FIG. 14. This gives structural strength to the heater shelf 55, providing lateral shear strength into both the upper shelf panel 227 and the lower heater shelf panel 225, when bonded into place using a polysulphide film adhesive 259.

Although the power wiring hookup is only shown with respect to the two film heater units 262 appearing at the top of FIG. 14, the same connection is used with the remaining three raised heater elements 53 shown in FIG. 14. The wiring as mentioned before for these raised heater elements travels through the wiring paths 233 cut or formed in the honeycomb structure 256.

The raised heater elements 53 are sheet stainless steel, of a thickness to remain rigid during the heating and cooling temperatures imposed on the heater shelves 55 when used in the FBT 9. The raised elements 53 are adhered by silicon adhesive 263 to the back side of the upper heater shelf panel 227 to cover the openings 260. The lower element of raised heater surface 53 has an etched resistive film heater 262 sandwiched between silicone pads 264 bonded in place.

As shown in the lower portion of FIG. 14, power is supplied to the film heater units 262 by wire leads 265 which are secured to an edge of the silicone pad 264 on the bottom of the heater unit as at 266. The ends of the film leads are covered with a strip 267 of the same silicone material as used in pads 261 which covers the bottom of the heater unit 262.

TRAY GUIDE DESCRIPTION

The heater shelf frame F also includes tray guide ledges 275 at opposite sides of the panel shown in FIGS. 14 and 15. The ledges include indents 277 and 279 located at the middle of the ledge and at the trailing edge of the ledge 275 respectively. As shown better in FIGS. 18 and 19 a short rib element 281 is located on the bottom surface of the tray 19 just inwardly of each elongated dish indent 51 of the tray and approximately at the middle point of the elongated indents 51. (Also see FIG. 11). FIG. 11 also shows the cutouts 210 in the leading edge of the tray 19. The attendant places the tray 19 on the heater shelf 55 with the cutouts 210 in the border of the tray 19 (also see FIG. 7). Immediately under the lower edge of the cantilever heater shelf support 59 which is so spaced from the lower heater shelf 55 that the tray becomes positioned between the two so that the lower edge of the cantilever support 59 will stay within the cutouts 210 of the tray along the leading edge of the tray thus forming a track for the tray as it is slid inwardly of the heater shelf 55. When the rib 281 reaches the middle indent 277 in the ledge guide 275 of the heater shelf it drops down into the indent thus positioning it in place and freeing the tray from the lower edge of the above positioned cantilever shelf support 59. This is shown in phantom in FIG. 10. The trailing edge of the tray 19 also has a downwarly extending rib 290 (FIG. 15) which drops into the indent 279 at the trailing edge thereof. The trays 19 can be withdrawn from their fully inserted position on the heater shelf 55 to a halfway inserted position with the rib 290 dropping into indent 277 of heater shelf 55 and the cutout 210 engaging the lower edge of the cantilever supported arms 59 whereby the tray 19 is anchored to prevent it from falling onto the floor. This arrangement permits one to pour beverages into the cups.

With the above arrangement the trays are insured of correct positioning with respect to the raised heater elements 53 when they are positioned or seated on the heater shelves 55 (see FIG. 7).

The modified diet trays 45 operate in the same manner except that the ribs 281 extend vertically downwardly from the underside of each longitudinal or elongated side of the tray. Cutouts 210 as noted in FIG. 13 in the upper border of the elongated sides of the tray are found on both sides of the tray instead of just the leading edge side as with the general diet tray 19.

CHILLED AIR CIRCULATION CONTROL

Figure 21:
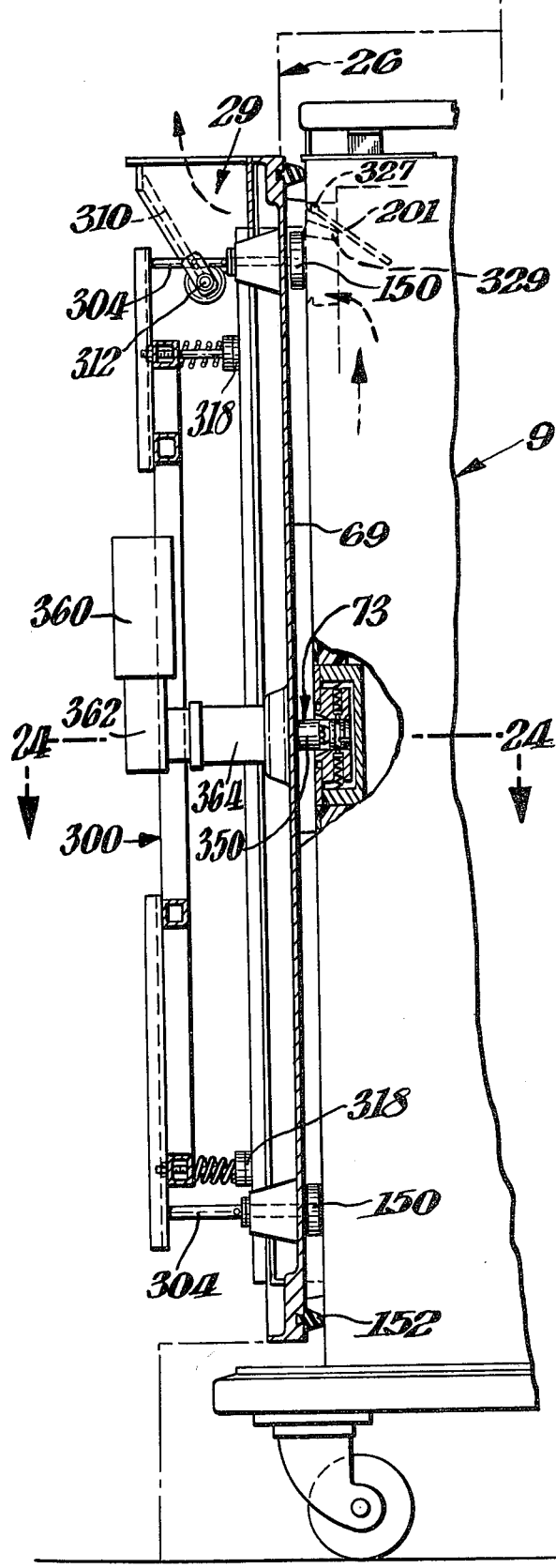
FIG. 21 is a side elevation in section illustrating the FBT coupled to the ECU.
Figure 21A:
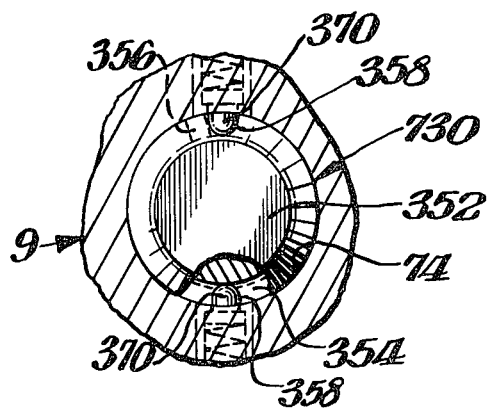
FIGS. 21A and B illustrate means for coupling the ECU and FBT.
Figure 22:
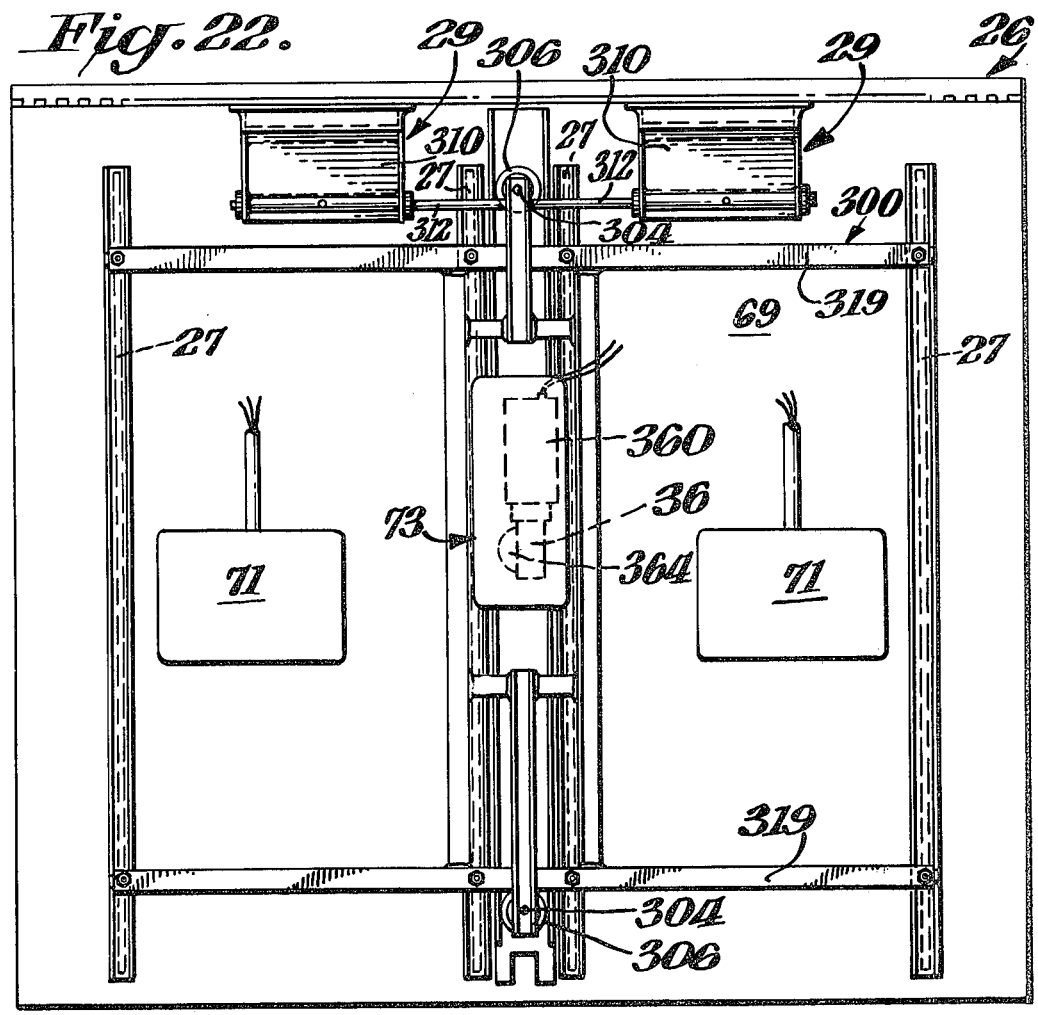
FIG. 22 is a rear elevation of the ECU illustrating the control frame.

FIGS. 20–24 illustrate the extendable-retractable frame 300 which controls the opening and closing of the circulating air intake vents 29 and the air discharge openings 27 in the KECU 25 and the FECU 26 as well as the air inlets 200 and the air discharge vents 201 of the FBT 9. The frame 300 is located just behind the front panel 69 on spring loaded slidable shafts 304 attached to the frame 300 and supported in bearing mounts 306 supported in the FECU front panel 69. The end of each shaft extending externally of the FECU front panel 69 is capped by a button 150. As shown in FIGS. 20-22, there are two shafts 304 located one above the other at the top and bottom of the FECU front panel 69, each having a push button 150 protruding externally from the FECU front panel 69.

Figures 23, 24:
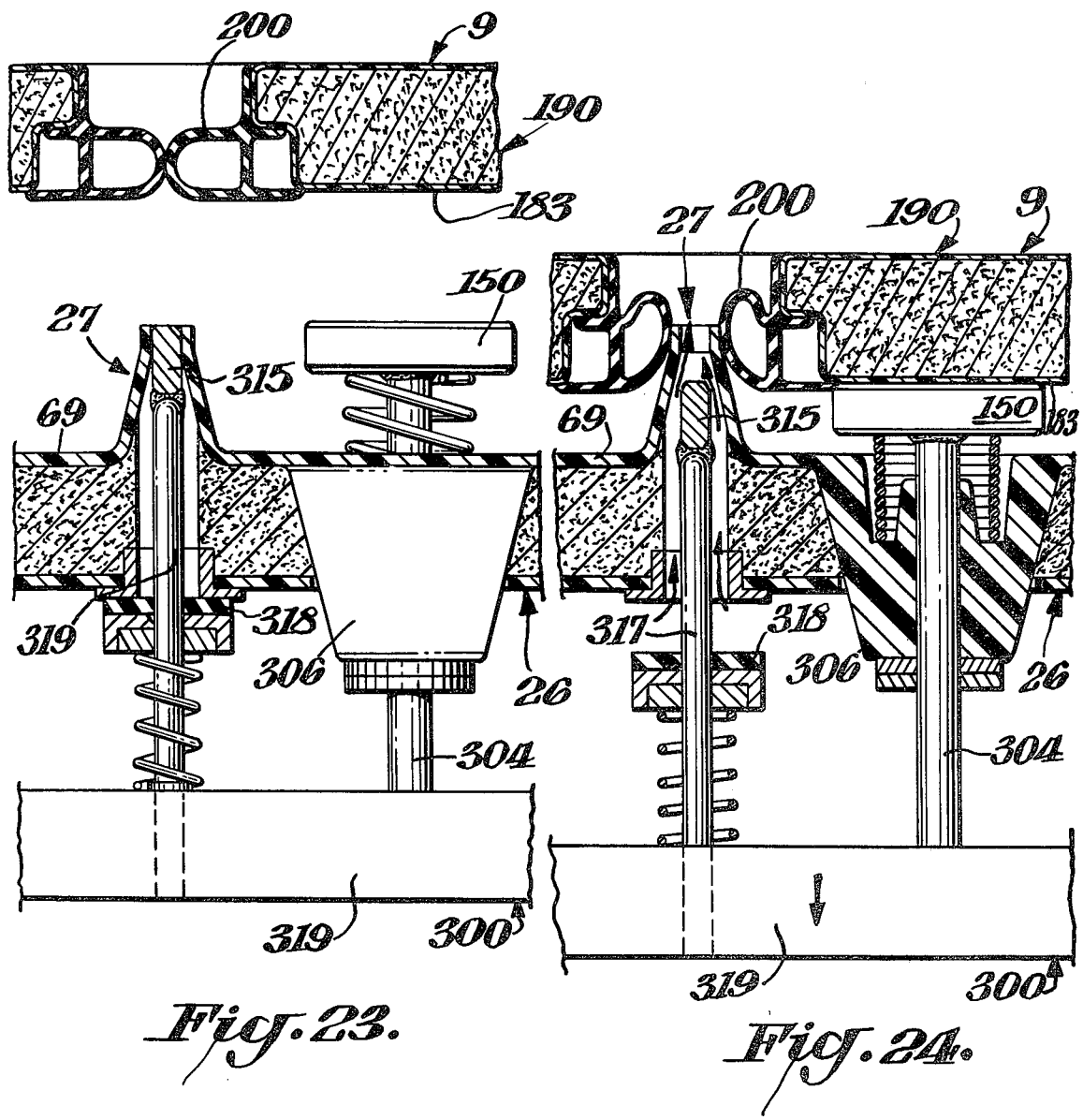
FIG. 23 is a section illustrating the refrigerated air outlet for the ECU with the FBT in uncoupled position.
FIG. 24 is a section illustrating the units of FIG. 23 in coupled position.

FIG. 23 shows the shaft 304 in the extended position as when the FECU 26 is in uncoupled relationship with the FBT 9 with the frame 300 in the forward position. FIGS. 21 and 24 show the buttons 150 urged inwardly by the back panel 183 of the FBT 9 which moves the shafts 304 away from the front panel 69 of the FECU 26 which in turn urges the frame 300 to its retracted position away from the front panel 69 as also shown in FIG. 21.

The inlets 29 (FIGS. 21, 22) of the FECU 26 for circulating chilled air are opened by the retraction of the frame 300 by pivoting open the doors 310 which are linked to the upper shaft 304 through linkable means 312 (FIGS. 21, 22). As the shafts 304 are retracted, the doors 310 pivot at the bottom backwardly out of the normal closed position to the open position (FIGS. 20-22).

The retraction of the frame 300 as the FECU 26 and FBT 9 become coupled also opens the vertical air inlets 200 for the FBT 9. As shown in FIGS. 23 and 24, the vertical air outlets 27 in the front panel of the FECU 26 spread the lips of the flexible vertical air seals 200 on the back panel of the FBT 9 as the FBT 9 is coupled to the FECU 26 or KECU 25. At the same time a plug 315 which fills the vertical air outlet 27 in the FECU 26 is moved backwardly to open the outlet 27. The plug 315 is affixed to a springed loaded extendable and retractable shaft 317 and in turn secured to the horizontal arms 319 (FIG. 22) of the frame 300. As the buttons 150 retract, the frame 300 retracts the shaft 317, seal member 318 and plug 315 to their open position as shown in FIG. 24 to permit chilled air to pass from the FECU 26 into the FBT 9 through flexible vertical seal 200.

Figure 26:
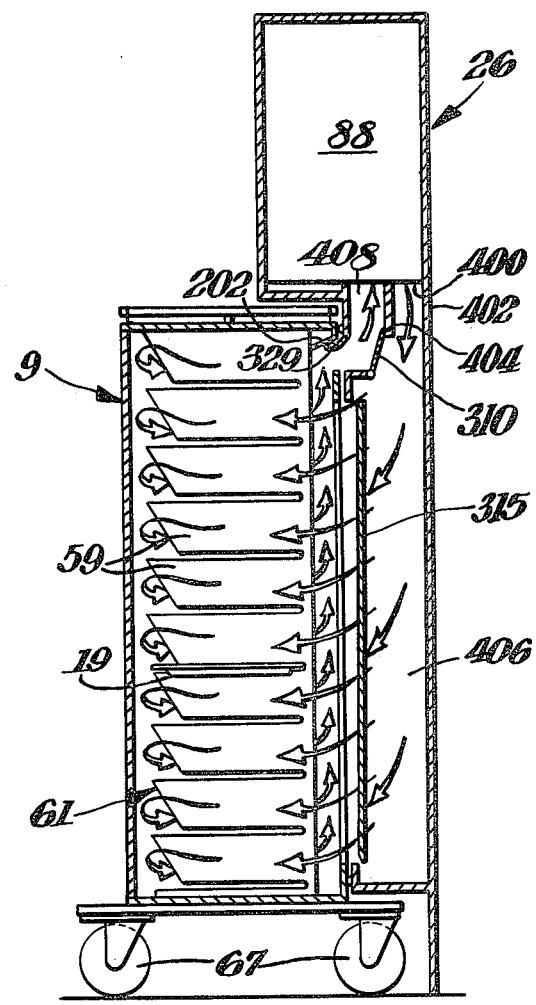
FIG. 26 is a schematic illustrating the refrigerated air loop circulation pattern through the ECU and FBT in coupled position.

Also, the outlets 201 for the circulating chilled air located in the rear panel of the FBT 9 (see FIGS. 6 and 20) are moved to the open position during the coupling of the FBT 9 to the FECU 26. As shown in FIGS. 6 and 20, the outlets 21 are normally closed by free swinging doors 202 pivoted at points 327. Fixed fingers 329 located just above outlet 29 of the FECU 26 contact the doors 202 during the coupling of the FECU 26 to the FBT 9 to urge or push the doors 202 inwardly within the FBT 9 to the open position as shown in FIG. 21 and 26.

Wtih the above arrangement, cold air is circulated from the FECU 26 through the FBT 9 and then back into the FECU 26 in a closed loop pattern which will be better illustrated later.

COUPLING MECHANISM

As shown in FIGS. 20-22 and FIGS. 21A and B, an extendable-retractable linear actuator assembly 73 is connected with the FECU 26 and extends through the front panel 69 of the FECU. The actuator assembly 73 couples the FBT 9 tightly up against the front panel 69 of the FECU. As shown better in FIG. 20, the assembly 73 includes an actuator crank 350 having a head 352 with a circumferential groove 354 with a stop pin 356 extending vertically from the base of the groove. Leading into the circumferential groove 354 from the free end of the head 352 are a pair of diametrically opposed axial grooves 358. The actuator crank 350 is extended and retracted through the drive motor 360, gear box 362 and slip clutch 364. The retraction and extension is achieved through a worm gear arrangement which also rotates the actuator crank 350. The crank 350 will extend about three inches beyond its fully retracted position and the retraction and extension of the crank can be manually controlled by switch 94 mounted on the control panel 86 of the FECU 26, or automatically by the insertion of the TMP 7 into the TCU 33 front panel receptacle 35.

Supported in the back panel of the FBT 9 is a female socket 74. The female socket 74 includes a pair of diametrically opposed spring loaded pins 370 which extend into the barrel of the female socket assembly 74.

Figure 21B:
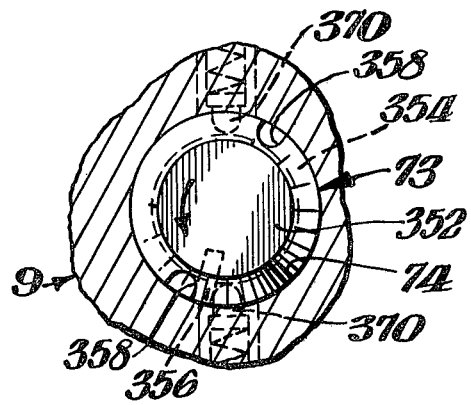

In practice, the FBT 9 is moved into position so that the back panel of the FBT 9 lies within 3 inches of the front panel of the FECU. The switch 94 on the panel 86 of the FECU 26 is then moved to the extend position and the actuator crank 350 extends outwardly from its retracted position about three inches. Since the back panel of the FBT 9 is positioned within three inches of the FECU front panel the head 352 of the crank 350 enters the female socket 74 and the spring loaded pins slide into the axial grooves 358 of the head 352 until they become lodged in the circumferential groove 354 of the head 352. At this point, the head rotates to lock the pins 370 in the circumferential groove 354 and the rotation continues until one of the pins hits the vertically disposed stop pin 356 in the circumferential groove 352 as shown in FIG. 21B. The switch 94 is then moved to the retract position and the crank 350 retracts to pull the FBT 9 inwardly tightly up against the front panel of the FECU which also compresses sealing gasket 152 to form a tight seal between the coupled units. Alternatively, if the switch 94 is not actuated, the TCU 33 will automatically instruct the crank 350 to retract after a 30 second lapse in time. The FBT 9 and the FECU are now in coupled position and the circulation of the chilled air initiates from the FECU through the FBT 9 and back to the FECU in a continuous closed loop pattern to keep the food items stored in the FBT at 40° F. ± 5°.

CIRCULATION PATTERN FOR CHILLED AIR

Figure 25:
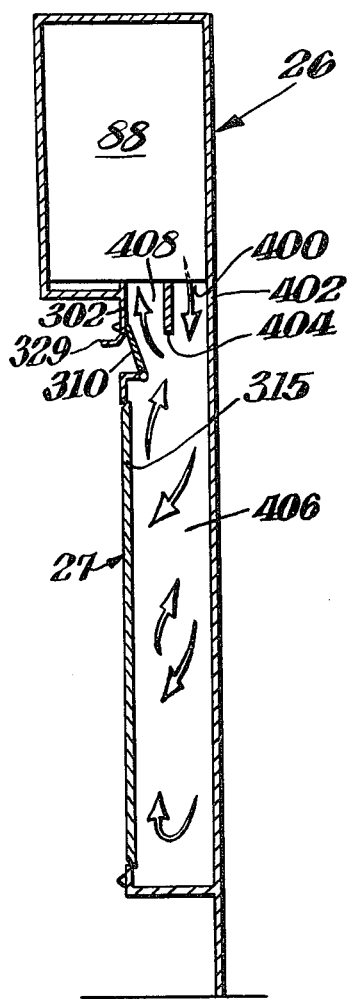
FIG. 25 is a schematic illustrating the refrigerated air loop circulation pattern in the ECU prior to coupling with the FBT.

To illustrate the circulating pattern of the chilled air in the system of the present invention, a schematic of the uncoupled FECU 26 is shown in FIG. 25 while FIG. 26 illustrates the air pattern assumed through the FECU and the FBT 9 when coupled together. As seen in FIG. 25 the chilled air travels from the evaporator section of the chilled air unit 88 of the FECU 26 downwardly through opening 400 defined by the rear wall 402 of the FECU and the partition 404 whereupon it passes into compartment 406 descending into the FECU plenum chamber 406. It is then drawn off as indicated by the arrows in FIG. 25 to return to the chilled air unit 88 through opening 408 defined by the front panel 302 of the FECU and the partition 404. In the uncoupled position, the FECU air inlet doors 310 and the air inlets 27 are closed whereby chilled air is circulated through the FECU continuously in the closed loop pattern described above before being coupled with an FBT 9.

Figure 27:
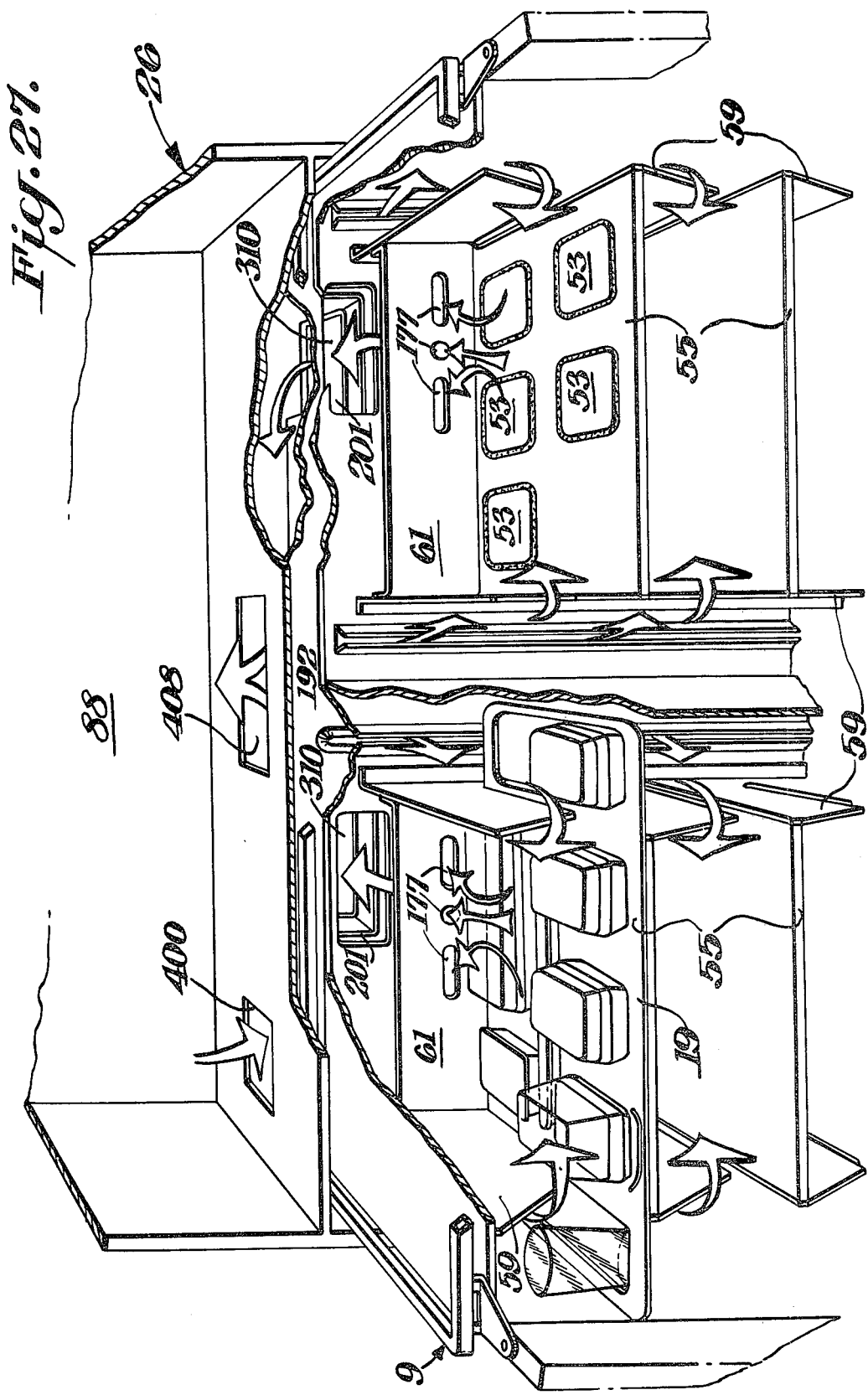
FIG. 27 is another schematic illustrating the refrigerated air loop circulation pattern through the ECU and FBT when in coupled position.

FIGS. 26 and 27 depict the FBT 9 coupled to the FECU with the air inlets and outlets of both the FBT 9 and the FECU being the open position as explained previously herein. Here the chilled air passes into the FBT 9 to travel along the sides of the heater shelf rack 61, forward to the front of the heater shelf rack arms 59 and, as better shown in FIG. 27, back over the trays 19 or 45, through vents 177 in the rear of the heater shelf rack and then out of the FBT 9 through the outlet ports 201 controlled by doors 310. From this point they are returned to the chilled air unit 88 through inlet 408 and then recycled into the FECU and FBT in the continuous loop pattern described above with the air being reconditioned by the air chilling apparatus in compartment 88 of the FECU 26.

As is clear from the drawings the chilled air is uniformly distributed over the heater shelves 55 and the trays 19 or 45 supported thereon to chill all the food items on the many trays in a uniform manner.

Because the dishes being heated and their covers or lids are noninsulated, loss of nutritional values of the food being heated is minimal. This is explained by the fact that the dishes being heated are simultaneously exposed to the continuous flow of chilled air which tends to cool the dish and cover surfaces and returns moisture lost in cooking back into the food product, and at the same time tempers the rate at which the food is cooked. The total effect is somewhat akin to low pressure steam cooling.

What is claimed is:

1. Apparatus for coupling a first and second cabinet including a female socket in the back panel of the first cabinet, a linear actuator assembly extending through the front panel of the second cabinet, said linear actuator assembly including an extendable, retractable and rotatable male crank, drive means for extending, retracting and rotating said crank, said socket including mating means, said crank including means for engaging said mating means upon extension and rotation of said crank whereby said cabinets may be drawn toward each other upon retraction of said crank.

2. The apparatus of claim 1 wherein said mating means comprises a pair of diametrically opposed spring loaded pins, said crank terminating in a head having an annular groove adjacent the outer end of the crank, a pair of axial grooves in said head extending from the outer end of said crank to said annular groove and dimensioned to permit said pins to enter said annular groove from said outer end upon linear extension of said crank, said pins being confined in said annular groove upon rotation of said crank, and stop means in said annular groove to limit the extent of rotation of said crank.

* * * * *